(12) United States Patent
Serban

(10) Patent No.: US 7,091,436 B2
(45) Date of Patent: Aug. 15, 2006

(54) FLEXIBLE KEYBOARD

(75) Inventor: Bogdan Serban, Leudelange (LU)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 10/499,294

(22) PCT Filed: Dec. 17, 2002

(86) PCT No.: PCT/EP02/14358

§ 371 (c)(1),
(2), (4) Date: Dec. 15, 2004

(87) PCT Pub. No.: WO03/056416

PCT Pub. Date: Jul. 10, 2003

(65) Prior Publication Data

US 2005/0095934 A1    May 5, 2005

(30) Foreign Application Priority Data

Dec. 28, 2001   (LU) ........................ 90871

(51) Int. Cl.
H01H 1/14      (2006.01)
(52) U.S. Cl. ............... 200/512; 200/508; 200/511
(58) Field of Classification Search ............... 200/508, 200/511, 512–517; 2/905.1
See application file for complete search history.

(56) References Cited

U.S. PATENT DOCUMENTS 3,699,294 A * 10/1972 Sudduth ................. 200/243
4,317,012 A * 2/1982 Itoh ........................... 200/5 A
5,695,859 A * 12/1997 Burgess ..................... 200/86 R
6,603,408 B1 * 8/2003 Gaba ........................... 341/34
6,642,467 B1 * 11/2003 Farringdon .................. 200/511
6,875,938 B1 * 4/2005 Schmiz et al. .............. 200/310

FOREIGN PATENT DOCUMENTS

EP           0989509         3/2000

OTHER PUBLICATIONS

U.S. Appl. No. 10/499,294, filed Dec. 15, 2004, Serban.

* cited by examiner

Primary Examiner—Elvin Enad
Assistant Examiner—M. Fishman
(74) Attorney, Agent, or Firm—Oblon, Spivak, McClelland, Maier & Neustadt, P.C.

(57) ABSTRACT

A flexible data input device including a first textile layer and a second textile layer, which are arranged spaced apart from each other by a spacer. The spacer includes apertures delimiting the active zones of the data input device. The two textile layers are electroconductive in the active zones and a material with pressure-variable resistance is applied in the active zones, at least on one of the textile layers.

14 Claims, 1 Drawing Sheet

FLEXIBLE KEYBOARD

INTRODUCTION

Figure 1:
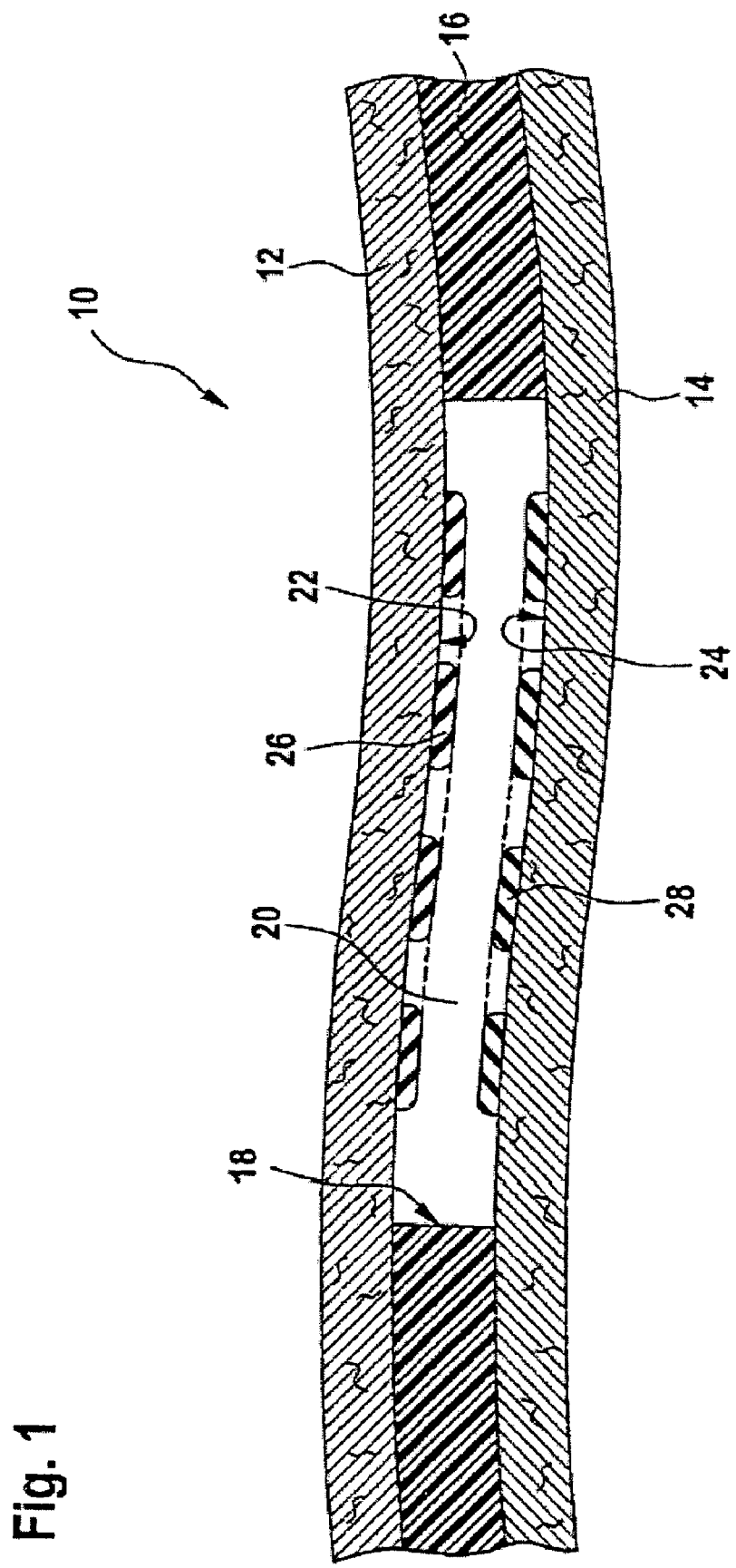

The present invention relates in general to a flexible data input device such as a flexible keyboard.

To make it easier to input data into pocket computers (PDAs), it is possible to connect a portable alphanumeric keyboard to said pocket computer. These portable keyboards often comprise several rigid keyboard elements that are linked together by hinges, so that they can be folded up. Such a keyboard is, for example, described in document WO-A-00/60438.

To further reduce the stowed size of a keyboard, keyboards made of textile material have been developed. Such a keyboard comprises first and second electrically conductive textile layers that are placed a certain distance apart by means of a spacer fabric. The textile layers are, for example, woven or knitted using electrically conductive yarns and insulating yarns. When an electrical voltage is applied between two terminals of one of the layers, an electrical gradient is created between the two terminals of the electrically conductive textile layer. When a force is exerted on one of the textile layers, the two layers come into contact and the electrical voltage measured is representative of the point of interaction of the force. A textile position detector that can be used as a keyboard is, for example, disclosed in document EP-A-0 989 509.

A simple and inexpensive keyboard is produced in this manner that has a high degree of flexibility, for example allowing it to be wound around the pocket computer. One disadvantage of such a keyboard is revealed when it is used on a curved surface. This is because, when the keyboard is curved the two electrically conductive textile layers easily touch each other, without the user exerting an actuating force on one of the textile layers. Since each contact between the layers is interpreted as an activation of a "key", it follows that the data input is corrupted by signals coming from an erroneous contact between the two electrically conductive layers.

OBJECT OF THE INVENTION

The object of the present invention is to propose a flexible data input device that considerably reduces the risk of any erroneous activation.

GENERAL DESCRIPTION OF THE INVENTION

This objective is achieved by a flexible data input device, comprising a first textile layer and a second textile layer, said first and second textile layers being arranged a certain distance from each other by means of a spacer, said spacer having openings that define active areas of said data input device. In accordance with the invention, said first and second textile layers are electrically conductive in said active areas and a material exhibiting pressure-variable resistance is applied, in the active areas, on at least one of the textile layers. Thanks to the material exhibiting pressure-variable resistance, the electrical resistance between the two textile layers varies with the pressure applied between the two layers. This device therefore makes it possible to define a pressure threshold above which a "key" defined by one of the active areas of the device is considered to be actuated by a user.

The determination of the resistance between the two textile layers for each active region, that is to say for each key, and the interpretation of this determination may be implemented by the pocket computer itself or by an electrical circuit of an interface connected to said device. The threshold will be set so as to be able to distinguish between an accidental contact between the two textile layers, caused by flexure of the device, and an intentional contact corresponding to the activation of one of the "keys". For a low pressure, such as that when an accidental contact between the two textile layers occurs, this resistance threshold will not be exceeded and the contact is not interpreted as the actuation of a key by a connected electronic circuit.

It should be noted that the variable-resistant material may equally well be a material whose internal resistance varies with pressure as a material whose surface resistance with the textile layers varies with pressure. In addition, the variable resistance may equally well increase with pressure as decrease.

The role of the variable-resistance material is to be able to distinguish the electrical resistance between the two textile layers when an accidental contact occurs from that when a key is activated. To do this, all that is required in general is to have a very thin layer of this material, above all in the case of a material whose variable resistance is based on the surface effect described above. Consequently, the flexibility of the device is barely affected by the application of this thin layer.

In one advantageous embodiment of the device, a material exhibiting pressure-variable resistance is applied, in the active areas, to each of the textile layers. This embodiment allows the thickness of the layers of variable-resistance material to be further reduced, while still ensuring good dynamic behaviour of the device.

The variable-resistant material, preferably a semiconductor material, may be easily applied to the textile layers by a screen-printing or spray method or by any other deposition method. It is then possible to apply it in the form of a continuous layer or else in the form of spots spaced apart over said textile layer in question. In the second case, the space in between the various spots will be chosen to be small enough not to allow direct contact between the textile layers. Such a configuration with several spaced-apart spots exhibits better flexibility compared to a continuous layer. Alternatively, and depending on the method of deposition chosen, the variable-resistant material may be applied in the form of microscopic granules. This embodiment ensures maximum flexibility of the keyboard.

The textile layers exhibit electrical conductivity at least in the active areas. This electrical conductivity may, for example, be achieved by the incorporation of conductive fibres into said fabric. In a preferred embodiment of the device, said first and second textile layers include a metal coating in the region of said active areas. The techniques involved in depositing such a metal coating can be well controlled and the fabrics can be produced at low cost. The applied layers are very thin and the flexibility of the fabric is entirely preserved. In addition, the metallization techniques allow the electrically conductive regions to be well delimited from the insulating regions.

In a preferred version of the invention, the first textile layer and the second textile layer each have a metal coating in the form of adjacent bands, the textile layers being oriented so that said coatings in the form of bands intercept in the active areas of said device. Similarly, a "matrix" arrangement may be produced wherein the bands of the first textile layer constitute the columns and the bands of the second layer constitute the rows. Thus, each active area, and therefore each key of the keyboard, is formed between a "column" band of the first textile layer and a "row" band of the second textile layer. Such an arrangement advantageously limits the number of connections needed to address the various active areas. This is because each active area may be monitored by measuring the resistance between the two respective bands forming the key.

It should be noted that such an arrangement also makes it easier to connect the device, since the metallized bands lend themselves well to being crimped.

In an alternative version, the first textile layer has a continuous metal coating and the second textile layer has a metal coating in the form of isolated sections localized at the points where the active areas are. In such an embodiment, the metal layer of the first textile layer constitutes the common electrode for each of the active areas of the device. The isolated sections of the second textile layer must be contacted individually in this embodiment. The conductors used for contacting the metal coatings are preferably deposited on the respective textile layer.

In both embodiments, it will be appreciated that the device comprises discrete active areas whose resistance may be determined individually. Unlike the keyboards of the digitising tablet (XY pad) kind, such a keyboard allows multiple attribution of the keys by means of a "shift" key.

The spacer of the device comprises a compressible or noncompressible woven or nonwoven, depending on the use. It will be appreciated that, in an alternative version, the spacer comprises an insulating granulated material applied to one of the textile layers. In this case, the particle size of the granulated material will be chosen so as to be greater than the thickness of the layer of variable-resistance material or alternatively to the particle size of the granules of variable-resistance material.

The device may be assembled using several known techniques. For example, the textile layers are laminated to said spacer or else are stitched thereto.

Description with the Aid of the Figures

Other particularities and features of the invention will emerge from the detailed description of one advantageous embodiment presented below, as an illustration, with reference to FIG. 1 appended hereto. This FIG. 1 shows a cross section through an active area of a flexible keyboard.

The keyboard 10 is formed by a first textile layer 12 and a second textile layer 14 that are placed a certain distance apart by means of a spacer 16. The spacer, which may be formed from a nonwoven, has openings 18 that define an active area 20 of the keyboard. Within the active area 20, each of the textile layers 12 and 14 is coated with a respective thin metal layer 22 and 24. The metallizations 22 and 24 of the textile layers 12 and 14 form the electrodes of the "key" defined by the active area 20.

To prevent any accidental contact between the two electrodes by bending the keyboard, a material 26 and 28 exhibiting pressure-variable resistance is applied to the respective two metallizations 22 and 24. The material is applied, for example using a screen printing process, in the form of spaced apart spots, the spacing between the spots being small enough to avoid direct contact between the two metallizations. Thus, the flexibility of the textile layers is advantageously preserved. Alternatively, the variable-resistance material may be applied in the form of a continuous layer. Such an embodiment is shown by the dotted lines in FIG. 1.

The invention claimed is:

1. A flexible data input device, comprising:
a first textile layer; and
a second textile layer,
said first and second textile layers being arranged a certain distance apart from each other by a spacer, said spacer including openings that define active areas of the data input device, wherein said first and second textile layers are electrically conductive in the active areas, and wherein a material exhibiting pressure-variable resistance is applied in the active areas on one of said first and second textile layers, wherein the material exhibiting pressure-variable resistance is in electrical contact with the other one of said first and second textile layers when a pressure greater than a certain value is applied to the active areas and is spaced apart from the other one of said first and second textile layers when a pressure less than the certain value is applied to the active areas.

2. The device as claimed in claim 1, wherein the material exhibiting pressure-variable resistance is applied in a form of a continuous layer in the active areas on said at least one of said first and second textile layers.

3. The device as claimed in claim 1, wherein the material exhibiting pressure-variable resistance is applied in a form of spaced-apart spots in the active areas on said at least one of said first and second textile layers.

4. The device as claimed in claim 1, wherein the material exhibiting pressure-variable resistance is applied in the active areas in a form of microscopic granules.

5. The device as claimed in claim 1, wherein said first and second textile layers include a metal coating in a region of the active areas.

6. The device as claimed in claim 1, wherein said first textile layer and said second textile layer each have a metal coating in a form of adjacent bands, said first and second textile layers being oriented so that said metal coatings in the form of bands of said first textile layer and said second textile layer intersect in the active areas.

7. The device as claimed in claim 1, wherein said first textile layer has a continuous metal coating and said second textile layer has a metal coating in a form of isolated sections arranged at locations of the active areas.

8. The device as claimed in claim 1, wherein said spacer comprises a compressible woven or nonwoven member.

9. The device as claimed in claim 1, wherein said spacer comprises a noncompressible woven or nonwoven member.

10. The device as claimed in claim 1, wherein said spacer comprises a granulated material applied to one of said first and second textile layers.

11. The device as claimed in claim 1, wherein said first and second textile layers are laminated to said spacer.

12. The device as claimed in claim 1, wherein said first and second textile layers are stitched to said spacer.

13. The device as claimed in claim 5, wherein conducting layers serving for contacting the metal coatings are deposited on said first and second textile layers.

14. A flexible data input device, comprising:
a first textile layer; and
a second textile layer,
said first and second textile layers being arranged a certain distance apart from each other by a spacer, said spacer including openings that define active areas of the data input device, wherein said first and second textile layers are electrically conductive in the active areas, wherein the material exhibiting pressure-variable resistance is applied to each of said first and second textile layers in the active areas, and wherein the materials exhibiting pressure-variable resistance, applied to each of said first and second textile layers in the active areas, are in mutual electrical contact when a pressure greater than a certain value is applied to the active areas and are mutually spaced apart when a pressure less than the certain value is applied to the active areas.

* * * * *